United States Patent [19]

Markusch et al.

[11] Patent Number: 5,654,085
[45] Date of Patent: Aug. 5, 1997

[54] POLYUREA ADHESIVE COMPOSITIONS

[75] Inventors: Peter H. Markusch, McMurray; Jeffrey A. Dodge, Wexford, both of Pa.; Robson Mafoti, Temple, Tex.

[73] Assignee: Bayer Corporation, Pittsburgh, Pa.

[21] Appl. No.: 604,118

[22] Filed: Feb. 20, 1996

Related U.S. Application Data

[63] Continuation-in-part of Ser. No. 354,401, Dec. 12, 1994, abandoned.

[51] Int. Cl.$^6$ .............................. B32B 3/00; B32B 7/10; B32B 7/12; C08G 18/28
[52] U.S. Cl. .............................. 428/221; 528/59; 528/73; 528/75; 427/207.1; 427/340; 427/372.2; 427/385.5; 427/487; 428/98; 524/445; 524/448; 524/451
[58] Field of Search .............................. 528/59, 73, 75; 521/251, 264; 427/487, 207.1, 340, 372.7, 385.5; 428/98, 221; 524/445, 448, 451

[56] References Cited

U.S. PATENT DOCUMENTS

| | | | |
|---|---|---|---|
| 4,444,976 | 4/1984 | Rabito | 528/60 |
| 4,954,199 | 9/1990 | Rains et al. | 156/333.7 |
| 4,994,540 | 2/1991 | Boemer et al. | 528/44 |
| 5,128,433 | 7/1992 | LeCompte et al. | 528/60 |
| 5,143,996 | 9/1992 | Chung et al. | 528/60 |
| 5,164,473 | 11/1992 | Dormish et al. | 528/44 |
| 5,175,228 | 12/1992 | Wang et al. | 528/48 |
| 5,204,439 | 4/1993 | Dormish et al. | 528/44 |

*Primary Examiner*—Samuel A. Acquah
*Attorney, Agent, or Firm*—Joseph C. Gil; Richard E. L. Henderson

[57] ABSTRACT

The present invention relates to a method for adhering two or more substrates by
(1) applying to a surface of one of said substrates a non-sagging polyurea adhesive composition comprising the reaction product of:
   (a) a polyphenyl polymethylene polyisocyanate or a urea-modified prepolymer thereof and
   (b) an isocyanate-reactive component comprising amines consisting essentially of
      (i) an aminocrotonate-terminated polyether containing at least two secondary amino groups prepared by reaction of a polyfunctional acetoacetylated polyether polyol with a primary monoamine, and
      (ii) a low molecular weight aromatic and/or aliphatic diamine, and
(2) contacting said substrate with a surface of a second substrate, and
(3) curing the polyurea adhesive composition.

15 Claims, No Drawings

POLYUREA ADHESIVE COMPOSITIONS

This application is a continuation-in-part of application Ser. No. 08/354,401 filed Dec. 12, 1994 now abandoned.

BACKGROUND OF THE INVENTION

1. Field of the Invention

The present invention relates to the use of polyurea compositions derived from polyphenyl polymethylene polyisocyanate and a select group of amines as adhesives.

2. Brief Description of the Prior Art

Non-sagging compositions are widely known and used commercially. Such materials are important because they are very convenient to use in many applications. An example would be adhesives and sealants used in automotive manufacturing where such formulations can be supplied and conveniently manipulated in a low-viscosity liquid form but then applied even to vertical surfaces as a thick non-running material.

Polyureas are also generally known in the art. Compared to polyurethane analogs, polyureas can have superior physical properties such as high temperature performance, adhesion, oil and solvent resistance, and tear strength. Due to the very high reactivity of most amine compounds toward isocyanates, polyurea formulations often have short gel-times, resulting in short "pot-life" (or working time). Therefore, polyurea compositions have been limited to applications where very short gel-times are desirable, such as in reaction injection molding. In addition, because only a few fast-reacting high-molecular weight polyamines have been available, the reactivity and viscosity profiles of polyurea formulations could not be adjusted sufficiently to provide non-sagging systems. Thus, although polyamines are known to impart sag resistance to polyurethane adhesive formulations (e.g., U.S. Pat. Nos. 4,444,976, 4,994,540, 5,128,433, 5,143,996, and 5,175,228), non-sagging adhesives containing only urea groups have not previously been described.

U.S. Pat. No. 5,128,433 discloses thixotropic polymer compositions comprising the reaction product of aromatic polyisocyanates, such as low molecular weight polyisocyanates based on 4,4'-diisocyanato-diphenylmethane, toluene diisocyanate or the like or their prepolymers, and one or more aromatic diamines. The compositions are said to be useful in making coatings, sealants, adhesive bonds and molds.

U.S. Pat. No. 4,954,199 discloses a structural member comprising a laminate and an adhesive where said adhesive is the reaction product of a specified proportion of polyurethane-urea forming components: (a) 100 parts by weight of at least one hydroxyl functional material having a molecular weight of at least 300 and a hydroxyl functionality of at least 2, said material being preferably selected from the group consisting of polyether polyols, polyester polyols, polyester amide polyols, and polycarbonate polyols; (b) 0.2 to 20 parts by weight of an aliphatic, aromatic, and/or a cycloaliphatic diamine or triamine; and (c) an organic isocyanate in an amount sufficient to render the isocyanate index between about 70 and about 150, wherein said component (c) is not prereacted with any of the components (a) and (b).

U.S. Pat. Nos. 5,164,473 and 5,204,439 disclose low viscosity two-component filled polyurethane adhesives which are useful as structural adhesives comprising a low viscosity isocyanate component in a quantity sufficient to provide an isocyanate index of about 100 to 150 comprising an organic polyisocyanate wherein up to 10 equivalent percent of the isocyanate groups of said polyisocyanate have been modified by reaction with one or more isocyanate-reactive compounds; a low viscosity curative component comprising 5 to 50 equivalent percent of a polyether polyol and/or a polyether terminated by aromatic amino groups having an equivalent weight greater than 500 based on the total equivalents of amino and hydroxyl groups of the curative component; 50 to 95 equivalent percent of one or more chain extenders comprising from 50 to 100 percent of the isocyanate-reactive equivalents based on the total equivalents of amino and hydroxyl groups of the equivalent component; and one or more isocyanate-reactive diamines or triamines in a quantity sufficient to produce adequate resistance to flow when the isocyanate and curative components are mixed, wherein at least one of these components contains at least one filler in a total quantity of from about 10 to about 40 percent by weight of the filled polyurethane adhesive.

During automobile manufacturing, structural adhesives that are used to bond polymeric automobile panels such as fascia can be subjected to temperatures of about 200° C. or higher. At these high temperatures, many of the art-related adhesives such as polyurethane adhesives loose their integrity by foaming, cracking, and/or softening with a consequential loss in physical and other adhesive properties.

As would be realized, there is a need for structural adhesives that can withstand high temperatures.

Surprisingly, it was found that by using aminocrotonated polyethers, it is now possible to prepare blends containing only polyamine chain extenders and amine-terminated, soft-segment compounds with a balanced reactivity of the amines toward isocyanates. It is, therefore, possible in practice to prepare non-sagging all-urea compositions. Thus, the desirable physical properties of polyureas can now be combined with non-sagging characteristics. As would be realized, preparation of such compositions demands highly controllable reactivity in order to optimize viscosity profile, homogeneity, gel-time, working life, and green strength. An unbalanced reactivity of the amines can also result in agglomeration of urea upon mixing with the isocyanate. This leads to inhomogeneous materials and unacceptable physical properties. By the present invention, one avoids the above problems because it is now possible to prepare all-amine blends of chain extenders and soft segments which provide improved reactivities and physical properties.

SUMMARY OF THE INVENTION

In accordance with the foregoing, the present invention encompasses a method for adhering two or more substrates comprising (1) applying to a surface of one of said substrates a non-sagging polyurea adhesive composition comprising the reaction product of:
 (a) a polyphenyl polymethylene polyisocyanate or a urea-modified prepolymer thereof and
 (b) an isocyanate-reactive component comprising amines consisting essentially of
  (i) an aminocrotonate-terminated polyether containing at least two secondary amino groups, said aminocrotonate-terminated polyether being prepared by reaction of a polyfunctional acetoacetylated polyether polyol with a primary monoamine, and
  (ii) a low molecular weight aromatic or aliphatic diamine or a mixture thereof, and (2) contacting said substrate with a surface of a second substrate, said second substrate optionally having applied thereto the polyurea adhesive composition, (3) curing the polyurea adhesive composition.

The polyurea composition of the invention exhibits improved sag resistance at room temperature. This is manifested as a small bead of the reacting material placed on a vertical surface not flowing, sagging, or dipping to make the material convenient to use in the field. The polyurea compositions are characterized by excellent adhesive properties, as determined by lap shear testing.

DETAILED DESCRIPTION OF THE INVENTION

The polyurea compositions used in the method of the invention can be prepared by reacting the polyphenyl polymethylene polyisocyanate or a modified-urea prepolymer thereof with the mixture of amines (b) of the invention in an equivalent ratio of the isocyanate-to-the amine in the range of about 0.9:1 to about 1.4:1 (preferably 1.1:1 to 1.3:1).

The polyphenyl polymethylene polyisocyanate or the urea modified prepolymer thereof usually has an isocyanate content of about 20 to about 33% by weight, preferably about 28 to about 33% by weight. Suitable polyisocyanates can be obtained by phosgenating aniline/formaldehyde condensation products. Examples thereof and their method of preparation can be found in literature references such as *Polyurethane Handbook*, 2nd Edition, G. Oertel, Hanser Publishers, Munich, Vienna, New York, pages 73–83, and U.S. Pat. No. 3,471,543, which are incorporated herein by reference.

The urea-modified prepolymer can be prepared by reacting the polymeric polyphenyl polymethylene polyisocyanate with an amine. Examples thereof and their method of preparation are disclosed in U.S. Pat. No. 5,164,473, which is incorporated herein by reference.

The isocyanate-reactive component is a mixture of amines consisting essentially of aminocrotonate polyethers (b)(i) and low molecular weight aromatic and/or aliphatic diamines (b)(ii).

A critical feature of the aminocrotonate-terminated polyethers (b)(i) is a retarded reactivity relative to aminocrotonates used in the reaction injection molding ("RIM") method, which requires amino-crotonates having about the same reactivity as the amine chain extenders. In the RIM process, it is necessary for all of the reactants to react rapidly and essentially simultaneously so that demold times can be kept short (e.g., 20 to 90 seconds). For structural adhesives, on the other hand, it is necessary for at least a portion of the isocyanate-reactive components to react immediately upon mixing in order to provide the desired rapid viscosity increase and thus the desired non-sagging character. After the initial reaction occurs, a much slower, controlled reaction of unreacted portions of the amino-crotonate-terminated polyether component leads to gelling and final curing of the adhesive. Previously known non-sagging urea-based adhesives have exhibited excessively rapid curing that does not allow a sufficient working life after application to allow effective adhering together of the substrates.

Suitable aminocrotonate-terminated polyethers (b)(i), which contain as the reactive functionalities only secondary amino groups, can be prepared by aminolysis of corresponding acetoacetylated polyether polyols using primary monoamines in which the primary —NH$_2$ groups are attached to aliphatic or aromatic carbon atoms. Examples of suitable aminocrotonate-terminated polyethers and their method of preparation can be found in literature references such as U.S. Pat. Nos. 3,691,112, 3,666,726, and 5,066,824 (see also U.S. Pat. No. 5,151,470 for related methods), which are incorporated herein by reference. Suitable primary monoamines having aliphatically bound amino groups include cyclohexylamine, n-butylamine, and benzyl amine, as well as various polyoxyalkylene polyethers (preferably those based on ethylene oxide and/or propylene oxide) in which the only isocyanate-reactive group is a primary amino group. Suitable primary monoamines having aromatically bound amino groups include aniline. The resultant aminocrotonate polyethers have a molecular weight of 500 to 5000 (preferably 1000 to 3000) and a functionality of 2 to 6 (preferably 2 to 3).

Suitable low molecular weight diamines (b)(ii) have molecular weights of about 60 to about 400, preferably 60 to 300. Although it is possible for such compounds to contain both an aliphatically bound amino group and an aromatically bound amino group, preferred low molecular weight diamines contain either two aromatic amino groups or two aliphatic amino groups. Examples of suitable low molecular weight aromatic diamines include toluene diamine, diethyltoluene diamine, 1,3,5-triethyl-2,4-diaminobenzene, dimethylthiotoluene diamine, 4,4'-diphenylmethanediamine, trimethylene glycol di-p-aminobenzoate, and bis(4-n-butylaminophenyl)methane. Examples of suitable low molecular weight aliphatic diamines include isophorone diamine, 4,4'-diamino-3,3'-dimethyldicyclohexylmethane, piperazine, bis(4-aminocyclohexyl)methane, ethylenediamine, and hexamethylenediamine.

When preparing the polyurea composition, the polyphenyl polymethylene polyisocyanate or the urea modified prepolymer thereof and the mixture of amine can be combined in any order. Typically, the resulting combination (blend) is subjected to isocyanate addition reaction at ambient or elevated temperatures of up to 150° C. and preferably 110° to 135° C. Solvents which are typically inert solvents can be used for ease of reaction. Although catalysts are not ordinarily required, they can be used if desired. The reaction product comprises the polyurea composition of the invention.

In the practice of the invention, the polyurea composition can be formulated with additives such as fillers, pigments, molecular sieves, catalysts, and auxiliaries such as flow agents, surface-active additives, anti-foaming agents, dyes, UV-stabilizers, and fungistatic and bacteriostatic substances, such as those described in European Patent Application 81,701 at column 6, line 40 to column 9, line 31.

Suitable fillers, particularly for the high temperature application (thermal properties), include minerals, e.g. silicate-containing minerals, such as antigorite, serpentine, hornblends, amphiboles, chrysotile, talc, mica, and kieselguhr; metal oxides such as kaolin, aluminum oxides, titanium oxides, and iron oxides; metal salts such as chalk and heavy spar (barium sulfate); inorganic pigments such as cadmium sulfide and zinc sulfide; and glass, asbestos powder, carbon fibers, and the like. Preferred fillers are substantially inert under the conditions encountered when the components of the invention are mixed. The preferred fillers are talc, wollastonite, or clay. A particularly preferred filler is talc. Fillers may be used either individually or in admixture. The fillers are added to either or both of components (a) and (b) in quantities totaling about 10 to about 40% by weight based on the total quantity of the filled adhesive.

Suitable auxiliary agents and additives may include, for example, catalysts for the polyisocyanate-polyaddition reaction, drying agents, surface-active additives, antifoaming agents, pigments, dyes, UV stabilizers, and plasticizers. Typically, drying agents help to avoid formation of bubbles that adversely affect high temperature performance. Preferably the drying agents are molecular sieve zeolites that can be employed in an amount of 1 to 15 parts by weight per 100 parts of amine mixture (b). Specific but non-limiting examples of the molecular sieves can be sodium aluminosilicate in aminocrotonated polyether (1:1) or sodium aluminosilicate powder.

In the practice of the invention, the isocyanate component is mixed with the isocyanate-reactive component in a predetermined ratio designed to provide an isocyanate index of from 100 to 150. The term "isocyanate index" is defined as the quotient, multiplied by 100, of the number of isocyanate groups divided by the number of isocyanate-reactive groups.

The polyisocyanate and the mixture of amines used to prepare the polyurea composition of the present invention are characterized by low viscosities. As used herein, the term "low viscosity" refers to a Brookfield viscosity at 25° C. of less than about 20,000 mPa.s. Despite the low viscosity of the reactive components, excellent sag resistance is obtained when the isocyanate and amine blend are mixed.

The filler, as well as the optional additives and auxiliaries, can be mixed with either or both of the isocyanate component and the isocyanate-reactive component but is preferably mixed with the isocyanate-reactive component. The components may be mixed by any of various known methods, including impingement mixing and static mixing, and may be applied to the substrate to be bonded as thin films or in the form of beads.

The polyurea compositions can be used in adhesive, caulking, and sealant applications. It is preferred to employ the polyurea composition in adhesive applications for bonding different or similar substrates. The adhesive can be used to bond substrates such as steel, aluminum, polyurethane, epoxy, or fiber-reinforced polyester. The process for bonding the substrates comprises applying the adhesive to a subject substrate, and contacting the surface with a surface of another substrate to which is optionally applied the adhesive. The adhesive can be applied by any convenient means, such as impingement mixing, or static mixing.

This and other aspects of the invention are further illustrated but are not intended to be limited by the following examples in which all parts and percentages are by weight unless otherwise specified.

EXAMPLES

Aminocrotonate-terminated Polyether Synthesis

An aminocrotonate polyether was prepared using the following procedure. Poly(tetramethyleneoxide) diol (75.96 parts, equivalent weight 500) was reacted with tert-butylacetoacetate (24.04 parts) at 175° C. under vacuum. After four hours, FTIR analysis indicated complete loss of the OH absorption at 3300 $cm^{-1}$. The room-temperature viscosity was 520 mPa.s. This acetoacetylated product (85.5 parts) was reacted with cyclohexylamine (14.5 parts) at 110° C. under vacuum. After several hours, the product was cooled to room temperature (1790 mPa.s at 25° C.).

Example 1

An amine blend according to the invention was prepared using 63.5 parts cyclohexylaminocrotonate polyether (described above); 4.6 parts of a dimethylthiotoluene diamine isomer mixture available as Ethacure 300 (Ethyl Corp.); 1.5 parts bis(4-aminocyclohexyl)methane; 7.0 parts sodium aluminosilicate powder; and 23.4 parts talc powder. This blend was blended, degassed and reacted at an isocyanate index of 128 with a polymeric diphenylmethane diisocyanate (2,4'-isomer content about 1.6% and NCO functionality about 2.8). The reaction mixture was bag mixed to avoid incorporation of air bubbles and a 6"×6"×⅛" plaque was cast. After curing the material at 100° C. for one day, the Shore D Hardness was 55. The softening point, as determined using thermomechanical analysis (TMA), was 168° C.

Example 2

An amine blend according to the invention was prepared using 85.9 parts cyclohexylaminocrotonate polyether (described above); 2.2 parts piperazine; 1.7 parts diethyltoluene diamine; and 10.0 parts sodium aluminosilicate powder. This mixture was blended, degassed and reacted with the polyphenyl polymethylene polyisocyanate described in Example 1. The reaction was carried out at an isocyanate index of 130. The reaction blend was mixed, cast, and cured as described above for Example 1. The Shore A Hardness of the resultant plaque was 35.

Example 3

An amine blend according to the invention was prepared using 63.3 parts cyclohexylaminocrotonate polyether (described above); 7.5 parts trimethyleneglycol di-p-aminobenzoate (Polacure 740M, Air Products); 1.5 parts bis(4-aminocyclohexyl)methane; 4.0 parts sodium aluminosilicate powder; and 23.7 parts talc. The mixture was blended, degassed and reacted at an isocyanate index of 130 with the polymeric polyisocyanate described in Example 1. After blending, casting, and curing as described above, the material hardness was 56 Shore D.

Lap Shear Testing

Adhesion performance of Examples 1, 2, and 3 was screened by using the lap shear test method (SAE J1525). Samples were prepared using sheet molding compound plaques (4"×6"×0.125") and were bonded together using metal spacers to insure a bond thickness of 0.030 inches. The bond overlap was 1 inch. The bond surface of the sheet molding compound was buffed with a clean dry cloth prior to bonding to remove surface contaminants. The samples were cured in an oven at 135° C. for one hour and then conditioned at room temperature for one day. Test coupons (4×1 in.) were cut from the cured plaques using a diamond-tipped saw. Samples were tested at room temperature (ca. 23° C.). The maximum load values and percent substrate failure measurements are all averages of five samples. Test results are shown in the table below.

| | Adhesion Test Results Room Temperature Lap Shear Tests | |
|---|---|---|
| Adhesive | Maximum Load (PSI) | % Substrate Failure |
| Example 1 | 686 | 100 |
| Example 2 | 622 | 100 |
| Example 3 | 606 | 100 |

The results above clearly indicate that these all-urea adhesive of this invention provide excellent bond strength to sheet molding compound. The maximum load values of 606 to 686 psi show that these materials give sufficient adhesion to be classified as high-performance (or "structural") adhesives. In addition, the percent substrate failure measurements prove that the adhesive and adhesive bond are stronger than the substrate itself when tested under these conditions.

Example 4 (Comparison)

An aminocrotonate polyether having an amine number of 46 was prepared as described above except that the polyether was a propylene-oxide-based polyether diol (equivalent weight of 1000) and the amine was diethyltoluenediamine. The resultant polyether contained reactive primary amino groups in addition to secondary amino groups.

This aminocrotonate polyether was allowed to react with the following polyisocyanates at an NCO index of 1.05 in the absence of a chain extender:

Polyisocyanate I: A polyphenyl polymethylene polyisocyanate having a functionality of 2.4 and an NCO content of 32.6% NCO and containing 65% diphenylmethane diisocyanate monomer Polyisocyanate II: An isocyanate prepolymer having an NCO content of about 27% prepared by reaction of polyisocyanate I with a polyoxypropylene triol capped with ethylene oxide (equivalent weight of 2000)

Polyisocyanate III: A modified polyisocyanate having an NCO content of 25.4% prepared by reaction of 2,2,4-trimethyl-1,3-pentanediol with a polyphenyl polymethylene polyisocyanate having a functionality of 2.3 and an NCO content of 32.9% NCO and containing 80% diphenylmethane diisocyanate monomer The reaction mixtures had gel times of 3 to 5 minutes, which are unacceptably short for structural adhesive applications. These experiments clearly indicate the undesirability of having reactive primary amino groups in the aminocrotonate polyether. The primary amino groups of such compounds react more rapidly with the polyisocyanates, resulting in a more rapid increase in molecular weight and a faster gel time than observed for compounds of the invention.

Although the invention has been described in detail in the foregoing for the purpose of illustration, it is to be understood that such detail is solely for that purpose and that variations can be made therein by those skilled in the art without departing from the spirit and scope of the invention except as it may be limited by the claims.

What is claimed is:

1. A method for adhering two or more substrates comprising
   (1) applying to at least one of said substrates a non-sagging polyurea adhesive composition comprising the reaction product of:
      (a) a polyphenyl polymethylene polyisocyanate or a urea-modified prepolymer thereof and
      (b) an isocyanate-reactive component consisting essentially of
         (i) an aminocrotonate-terminated polyether containing at least two secondary amino groups, said aminocrotonate-terminated polyether being prepared by reaction of a polyfunctional acetoacetylated polyether polyol with a primary monoamine, and
         (ii) a low molecular weight aromatic or aliphatic diamine or a mixture thereof,
   (2) contacting said substrate with a surface of a second substrate, said second substrate optionally having applied thereto the polyurea adhesive composition, and
   (3) curing the polyurea adhesive composition.

2. A method according to claim 1 wherein the equivalent ratio of the isocyanate to the amine is 0.9 to 1.4.

3. A method according to claim 1 wherein the aminocrotonate-terminated polyether has a molecular weight of 500 to 5000 and a functionality of 2 to 6.

4. A method according to claim 1 wherein the aminocrotonate-terminated polyether is prepared by reacting the polyfunctional aceto-acetic acid ester with an aliphatic monoamine.

5. A method according to claim 1 wherein the aminocrotonate-terminated polyether is prepared by reacting the polyfunctional aceto-acetic acid ester with cyclohexylamine.

6. A method according to claim 1 wherein the low molecular weight diamine has a weight average molecular weight of about 60 to 400.

7. A method according to claim 1 wherein the low molecular weight diamine is an aliphatic diamine selected from the group consisting of isophorone diamine, 4,4'-diamino-3,3'-dimethyldicyclohexylmethane, piperazine, bis(4-aminocyclohexyl)methane, ethylenediamine, and hexamethylenediamine.

8. A method according to claim 1 wherein the low molecular weight diamine is an aromatic diamine selected from the group consisting of toluene diamine, diethyltoluene diamine, 1,3,5-triethyl-2,4-diaminobenzene, dimethylthiotoluene diamine, 4,4'-diphenylmethanediamine, trimethylene glycol di-p-aminobenzoate, and bis(4-n-butylaminophenyl)methane.

9. A method according to claim 1 wherein the non-sagging polyurea adhesive composition additionally comprises a filler comprising a mineral present in an amount from about 10 to 40 parts per 100 parts of the weight of polyurea adhesive composition and the filler.

10. A method according to claim 9 wherein the filler is selected from the group consisting of talc, wollastonite and clay.

11. A method according to claim 1 wherein the non-sagging polyurea adhesive composition additionally comprises a drying agent which is a molecular sieve zeolite that is present in an amount from 1 to 15 parts per 100 parts polyether polyol.

12. A method according to claim 11 wherein the molecular sieve is selected from the group consisting of sodium aluminosilicate in aminocrotonated polyether (1:1) and sodium aluminosilicate powder.

13. A method according to claim 1 wherein the polyurea adhesive composition is cured at ambient or elevated temperatures.

14. A method according to claim 1 wherein the polyurea composition is cured at elevated temperatures of 90° to 150° C.

15. A structural member which is prepared by the method of claim 1.

* * * * *